United States Patent [19]

Collins et al.

[11] 3,764,612
[45] Oct. 9, 1973

[54] PREPARATION OF 1-AMINOALKYLAMINO-9-OROTHIOXANTHENE-4-CARBOXALDEHYDES

[75] Inventors: Joseph C. Collins; David Rosi, both of East Greenbush, N.Y.

[73] Assignee: Sterling Drug Inc., New York, N.Y.

[22] Filed: Oct. 5, 1970

[21] Appl. No.: 78,221

[52] U.S. Cl. ....... 260/328, 260/247.1, 260/268 TR, 260/293.57, 260/326.3, 260/326.5 SA, 260/326.84, 424/248, 424/250, 424/267, 424/274, 424/275
[51] Int. Cl. ...................... A61k 27/00, C07d 65/18
[58] Field of Search .................................... 260/328

[56] References Cited
FOREIGN PATENTS OR APPLICATIONS
829,176    2/1960    Great Britain ..................... 260/328
1,128,861  5/1962    Germany ........................... 260/328

OTHER PUBLICATIONS
Hirschberg, et al., Cancer Research, 28, 601–607, March 1968.
Gonnert, World Health Organization Bulletin, Vol. 25, pages 702–706, 1961.
Theilheimer, Syn. Meth. of Org. Chem. (Karger, Basel, 1955), Vol. 9, p. 359, No. 871.
Chambers, et al., J. Org. Chem. 28: 3144–3147(1963).

Primary Examiner—Henry R. Jiles
Assistant Examiner—Cecilia M. S. Jaisle
Attorney—Elmer J. Lawson, B. Woodrow Wyatt, Thomas L. Johnson, Robert K. Bair, William G. Webb, Frederik W. Stonner, Roger T. Wolfe and Lynn T. Fletcher

[57]    ABSTRACT

1-($R_1R_2$N-Y-NH)-9-oxothioxanthene-4-carboxaldehydes, intermediates for the preparation of the corresponding 4-hydroxymethyl compounds, are prepared by heating 1-chloro-thioxanthen-9-one with $R_1R_2$N-Y-NHCH$_3$ to yield 1-[$R_1R_2$N-Y-NH(CH$_3$)]thioxanthen-9-one, reacting the latter compound with phosphorus oxyhalide and dimethylformamide to yield 1-[$R_1R_2$N-Y-N(CH$_3$)]-9-oxothioxanthene-4-carboxaldehyde and reacting said aldehyde with pyridine hydrochloride to produce 1-($R_1R_2$N-Y-NH)-9-oxothioxanthene-4-carboxaldehyde, where $R_1$ and $R_2$ are each lower-alkyl and Y is lower-alkylene having from two to four carbon atoms and having its two connecting linkages on different carbon atoms. The novel intermediates, 1-[$R_1R_2$N-Y-N(CH$_3$)]thioxanthen-9-ones, also have antibacterial activity.

10 Claims, No Drawings

PREPARATION OF 1-AMINOALKYLAMINO-9-OROTHIOXANTHENE-4-CARBOX-ALDEHYDES

PROCESSES AND COMPOUND

This invention relates to 1-aminothioxanthen-9-ones and to processes for their preparation.

The invention in its composition aspect resides in the compounds, 1-[$R_1R_2$N-Y-N(CH$_3$)]thioxanthen-9-ones, of the formula I

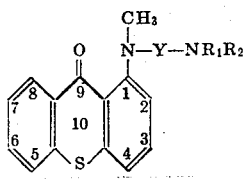

oxothioxanthene-4-carboxaldehyde (IV) and reacting said aldehyde with pyridine hydrochloride to produce 1-($R_1R_2$N-Y-NH)-9-oxothioxanthene-4-carboxaldehyde (V). Other process aspects of the invention reside in each of the second and third steps of the above-described process. The compounds produced by said three-step process, i.e., 1-($R_1R_2$N-Y-NH)-9-oxothioxanthene-4-carboxaldehydes (V), are useful as intermediates in the preparation of the corresponding 4-hydroxymethyl compounds, which are known schistosomacidal agents, illustrated by by 1-(2-diethylaminoethylamino)-4-hydroxymethylthioxanthen-9-one, generically known as hycanthone. The reductive conversion of the 1-($R_1R_2$N-Y-NH)-9-oxothioxanthene-4-carboxaldehydes to the corresponding 4-hydroxymethyl compounds is readily carried out by reacting the 4-carboxaldehyde with an appropriate reducing agent, e.g., sodium borohydride.

The process of the invention is illustrated by the following flowsheet:

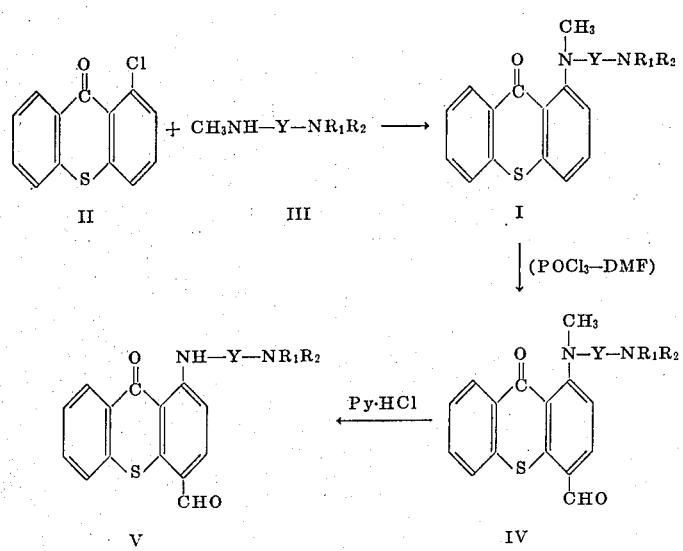

where $R_1$ and $R_2$ are each lower-alkyl, and Y is lower-alkylene having from two to four carbon atoms and having its two connecting linkages on different carbon atoms. The compounds of formula I not only are useful in the process aspect of the invention described hereinbelow but also possess the inherent applied use characteristics of having antibacterial activity, as determined by standard bacteriological evaluation procedures.

The invention in its process aspect resides in the process for producing 1-($R_1R_2$N-Y-NH)-9-oxothioxanthene-4-carboxaldehyde (V) which comprises heating 1-chlorothioxanthen-9-one (II) with $R_1R_2$N-Y-NHCH$_3$ (III) to yield 1-[$R_1R_2$N-Y-N(CH$_3$)]thioxanthen-9-one (I), reacting the latter compound with phosphorus oxyhalide and dimethylformamide to yield 1-[$R_1R_2$N-Y-N(CH$_3$)]-9- where $R_1$ and $R_2$ and Y are defined as above.

In the process and composition aspects of the invention the thioxanthen-9-one ring can bear from one to two substituents at positions 5, 6, 7 and 8 of the tricyclic ring selected from halo, lower-alkyl or lower-alkoxy; and, di-(lower-alkyl)amino the di-(lower-alkyl-amino moiety, i.e., $NR_1R_2$, can be replaced by other lower-tertiary-amino groups, e.g., (lower-alkyl)-(lower-2-hydroxyalkyl)amino or by saturated N-heteromonocyclic radicals having five to seven ring atoms, illustrated by piperidino, hexamethyleneimino, pyrrolidino, morpholino, piperazino and lower-alkylated derivatives thereof.

The term "lower-alkylene", as used herein, e.g., as represented by Y in Formulas I, II, IV and V, are alkylene radicals having from two to four carbon atoms and having its two connecting linkages on different carbon atoms, illustrated by -CH$_2$CH$_2$-, -CH(CH$_3$)CH$_2$-,

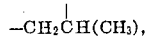 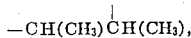

-CH(C$_2$H$_5$)CH$_2$-, -CH$_2$CH$_2$CH$_2$-,

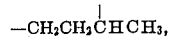

-CH$_2$CH$_2$CH$_2$CH$_2$-, and the like.

The terms "lower-alkyl" and "lower-alkoxy", as used herein, mean alkyl and alkoxy radicals having from one to six carbon atoms, illustrated by methyl, ethyl, n-propyl, isopropyl, n-butyl, 2-butyl, isobutyl, n-amyl, n-hexyl, and the like, for lower-alkyl, and by methoxy, ethoxy, n-propoxy, isopropoxy, n-butoxy, 2-butoxy, n-hexoxy, and the like, for lower-alkoxy.

The term "halo", as used herein, means chloro, bromo, iodo or fluoro, with chloro being preferred because of the ready availability and cost advantages of chloro intermediates.

When NR$_1$R$_2$ of Formulas, I, III, IV and V comprehend (lower-alkylated)-N-heteromonocyclic radicals, lower-alkyl radicals can be attached to any available ring-atom and can vary preferably from one to three in number, e.g., 2-methylpiperidino, 3-ethylpiperidino, 4-methylpiperidino, 2,6-dimethylpiperidino, 2,4-dimethylpiperidino, 2,4,6-trimethylpiperidino, 3-n-propylpiperidino, 2,2-dimethylpiperidino, 2-methylpyrrolidino, 2,5-dimethylpyrrolidino, 2,3-dimethylmorpholino, 2-ethylmorpholino, 2-methylhexamethyleneimino, 2,7-dimethylhexamethyleneimino, 4-methylpiperazino, 3-ethylpiperazino, 2,4,6-trimethylpiperazino, and the like.

The 1-[R$_1$R$_2$N-Y-N(CH$_3$)]thioxanthen-4-ones of the invention are useful in the free base form or in the form of their acid-addition salts, and both forms are within the purview of the invention, and are considered to be one and the same invention. The acid-addition salts are simply a more convenient form for use; and, in practice, use of the salt form inherently amounts to use of the base form. The acids which can be used to prepare the acid-addition salts are preferably those which produce, when combined with the free base, chemotherapeutically acceptable salts, that is, salts whose anions are relatively innocuous to the animal organism in chemotherapeutic doses of the salts, so that the beneficial properties inherent in the free base are not vitiated by side effects ascribable to the anions; in other words, the latter do not substantially affect the chemotherapeutic properties inherent in the cations. In practicing our invention, we found it convenient to employ the hydrochloride salt. However, other appropriate chemotherapeutically acceptable salts within the scope of the invention are those derived from mineral acids such as hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, benzenesulfonic acid, p-toluenesulfonic acid, quinic acid, 3-hydroxy-2-naphthoic acid, pamoic acid (2,2'-dihydroxy-1,1-dinaphthylmethane-3,3'-dicarboxylic acid), naponic acid (1,5-naphthalenedisulfonic acid), and the like, giving the hydrobromide, hydriodide, nitrate, phosphate, sulfamate, sulfate, acetate, citrate, tartrate, lactate, methanesulfonate, ethanesulfonate, benzenesulfonate, p-toluenesulfonate, quinate, 3-hydroxy-2-naphthoate, pamoate and naponate, respectively.

The acid-addition salts are prepared preferably by reacting the free base and acid in an organic solvent, e.g., ethanol, acetone, etc., in which case the salt separates directly or can be obtained by concentration of the solution.

Although chemotherapeutically acceptable salts are preferred, all acid-addition salts are within the scope of our invention. All acid-addition salts are useful as sources of the free base form even if the particular salt per se is not desired as the final product, as for example when the salt is formed for purposes of purification or identification, or when it is used as an intermediate in preparing a chemotherapeutically acceptable salt by ion exchange procedures.

The molecular structure of the said 1-[R$_1$R$_2$N-Y-N(CH$_3$)]thioxanthen-9-ones of our invention was assigned on the basis of evidence provided by infrared, ultraviolet and nuclear magnetic resonance spectra, by chromatographic mobilities, and, by the correspondence of calculated and found values for the elementary analyses for representative examples.

The manner of making and using the instant invention will now be generally described so as to enable a person skilled in the art of pharmaceutical chemistry to make and use the same, as follows:

The reaction of 1-chlorothioxanthen-9-one with R$_1$R$_2$N-Y-NHCH$_3$ is carried out by heating the reactants, preferably in the range of about 100 to 150°C. Lower temperatures, e.g., down to about 75°C., can be used but the reaction time is then longer; higher temperatures can be used but are of no particular advantage. The reaction was preferably carried out in a suitable solvent, e.g., pyridine, toluene, xylene, and the like. In practicing the invention, this step was preferably carried out in refluxing pyridine or in refluxing xylene in the presence of an acid-acceptor such as anhydrous potassium carbonate. The reaction of 1-[R$_1$R$_2$N-Y-N(CH$_3$)]thioxanthen-9-one with phosphorus xyhalide and dimethylformamide is carried out by slowly adding the phosphorus oxyhalide to a stirred mixture of 1-[R$_1$R$_2$N-Y-N(CH$_3$)]-thioxanthen-9-one and dimethylformamide; after the exothermic reaction subsides, the reaction mixture is then preferably gently heated, e.g., on a steam bath, to ensure completion of the reaction. Because of its ready availability and low cost, phosphorus oxychloride is preferably used.

The reaction of 1-[R$_1$R$_2$N-Y-N(CH$_3$)]-9-oxothioxanthene-4-carboxaldehyde with pyridine hydrochloride to produce 1-(R$_1$R$_2$-Y-NH)-9-oxothioxanthene-4-carboxaldehyde is carried out by heating the reactants. The reaction can be run between about 100° to 180°C., preferably between 120° to 160°C. The reaction can be run in the absence of a solvent, or, preferably, using a suitable inert solvent, e.g., xylene, toluene, dimethylformamide, and the like.

1-(R$_1$R$_2$N-Y-NH)-9-oxothioxanthene-4-carboxaldehyde is conveniently reduced to yield 1-(R$_1$R$_2$N-Y-NH)-4-hydroxymethylthioxanthen-9-one by reaction with a suitable reducing agent, e.g., sodium borohydride, using a suitable solvent, e.g., methanol, ethanol, and the like.

The antibacterial activity of the 1-[R$_1$R$_2$N-Y-N(CH$_3$)]thioxanthen-9-ones of the invention was determined by standard in vitro test procedures.

One procedure used to determine the antibacterial activity of said compound of the invention is the broth dilution test by the Autotiter method. To the first cup of the Autotray is added an aliquot (0.08 ml.) of an aqueous solution (1,000 mcg./ml.) of the compound to be tested. Activation of the Autotiter initiates a sequence of operations in which an aliquot (0.05 ml.) of the solution in the first cup is withdrawn by a Microtiter transfer loop and diluted in sterile tryptose phosphate broth (0.05 ml.) in the second cup. Inoculated tryptose phosphate broth (0.05 ml.) containing triphenyltetrazolium chloride (50 mcg./ml.) as an indicator is then automatically added. After the inital dilution, the dilutions continue in two-fold decrements (from 250 to 0.06 mcg./ml.). The Autotray is incubated (18–20 hr. at 37°C.) and the minimum inhibitory concentration determined as the concentration which inhibits formation of a red precipitate of the indicator.

In a modification of the foregoing broth dilution test the initial aliquot is different (0.1 mcg./ml. instead of 0.08 mcg./ml.), the broth contains glucose instead of tryptose phosphate, no indicator is used, the dilution range is different (from 500 to 0.06 mcg./ml. instead of 250 to 0.06 mcg./ml.) and inhibition is judged by turbidity instead of by the appearance of a red precipitate.

Bacterial organisms used in the above procedures include *Staphylococcus aureus*, *Klebsiella pneumoniae* and *Escherichia coli*.

Antibacterial values for 1-[(2-diethylaminoethyl)methylamino]thioxanthen-9-one determined by the above procedures are given hereinbelow in Example 1.

The best mode contemplated for carrying out the invention is now set forth as follows:

1. 1-[(2-Diethylaminoethyl)methylamino]thioxanthen-9-one - A mixture containing 100 g. of 1-chlorothioxanthen-9-one, 32.6 g. of N,N-diethyl-N'-methylethylenediamine and 150 ml. of pyridine was refluxed with stirring for thirty-six hours. The solvent was distilled off under reduced pressure. To the residue was added 300 ml. of water and the water was distilled off under reduced pressure. The residue was taken up in 800 ml. of 10 percent aqueous acetic acid solution; 8 g. of decolorizing charcoal was added; and, the mixture was filtered. The filtrate was extracted twice with 200 ml. portions of ethyl acetate and then made alkaline with 300 ml. of 35 percent aqueous sodium hydroxide solution. The alkaline solution was extracted three times with 400 ml. portions of ethyl acetate. The combined ethyl acetate extracts were washed with two 200 ml. portions of cold water, dried over anhydrous magnesium sulfate and evaporated in vacuo to remove the solvent and to yield, as an oil, 50.5 g. of 1-[(2-diethylaminoethyl)methylamino]thioxanthen-9-one. A 5.0 g. portion of this compound was converted into its hydrochloride by dissolving it in isopropyl alcohol, adding an excess of concentrated hydrochloric acid, removing the liquids by heating in vacuo and crystallizing the residue from acetonitrile to yield 2.4 g. of 1[(2-diethylaminoethyl)methylamino]thioxanthen-9-one dihydrochloride, m.p. 174°C. with decomposition.

When tested according to standard in vitro bacteriological evaluation procedures 1-[(2-diethylaminoethyl)methylamino]thioxanthen-9-one was found to have antibacterial activity, for example, to have bacteriostatic activity against *Staphylococcus aureus* and *Klebsiella pneumoniae* at respective concentrations of 250 and 500 mcg. per ml.

2. 1-[(2-Diethylaminoethyl)methylamino]-9-oxothioxanthene-4-carboxaldehyde - To 10.0 g. of 1-[(2-diethylaminoethyl)methylamino]thioxanthen-9-one dihydrochloride and 70 ml. of dimethylformamide was slowly added with stirring 5.5 ml. of phosphrous oxychloride whereupon an exothermic reaction caused the reaction temperature to rise to 55°C. The reaction mixture was then heated with stirring on a steam bath for one hour, cooled in an ice bath and poured into 200 ml. of ice water. The mixture was made alkaline with 30 ml. of 35 percent aqueous sodium hydroxide solution and the alkaline solution was extracted with three 100 ml. portions of chloroform. The combined chloroform extracts were washed with two 100 ml. portions of water, dried over anhydrous magnesium sulfate and evaporated in vacuo to remove the solvent. The residue was dissolved in 50 ml. of isopropyl alcohol; 2.5 ml. of concentrated hydrochloric acid was added; and, the mixture was evaporated in vacuo to leave a yellow semi-solid. The residue was dissolved in 200 ml. of warm isopropyl alcohol and stirred as a heavy yellow precipitate formed. The mixture was cooled in an ice bath, the solid was collected and dried overnight at 60°C. The solid was recrystallized from isopropyl alcohol and dried in vacuo at 60°C. to yield 5.1 g. of 1-[(2-diethylaminoethyl)methylamino]-9-oxothioxanthene-4-carboxaldehyde as its hydrochloride, m.p. 202°–204°C.

3. 1-(2-Diethylaminoethylamino)-9-oxothioxanthene-4-carboxaldehyde - A 2.0 g. portion of 1-[(2-diethylaminoethyl)methylamino]-9-oxothioxanthene-4-carboxaldehyde was heated with 5.0 g. of pyridine hydrochloride at 140°C. for 1 hour. The reaction mixture was treated with water and the resulting mixture was made basic with 35 percent aqueous sodium hydroxide solution. The alkaline mixture was extracted with ether, the ether extract dried over anhydrous magnesium sulfate and the solvent removed in vacuo. The oily residue was crystallized from isopropyl alcohol to yield 0.74 g. of 1-(2-diethylaminoethylamino)-9-oxothioxanthene-4-carboxaldehyde. The identity of this known compound was confirmed by its tlc analysis, infrared spectrum, melting point and conversion to hycanthone in Example 4.

This reaction also was carried out in 87 percent yield in refluxing xylene for two and one-half hours.

4. 1-(2-Diethylaminoethylamino)-4-hydroxymethylthioxanthen-9-one - A stirred mixture containing 0.74 g. of 1-(2-diethylaminoethylamino)-9-oxothioxanthene-4-carboxaldehyde and 100 ml. of methanol was treated portionwise at room temperature with sufficient sodium borohydride to reduce the 4-carboxaldehyde to the corresponding 4-hydroxymethyl compound; the reduction was followed by tlc analysis and was completed in less than 1 hour. The methanol was distilled off under reduced pressure and the oil was taken up with 50 ml. of benzene. The benzene solution was washed with water until the washings were at a pH of about 8.0. The benzene solution was dried over anhydrous magnesium sulfate, concentrated to a volume of about 15 ml., treated with 50 ml. of warm ether and allowed to stand. The resulting crystalline precipitate was collected and identified as 1-(2- diethylaminoethylamino)-4-hydroxymethylthioxanthen-9-one by its melting point, its infrared, ultraviolet and nuclear magnetic resonance spectra, and its elemental analysis.

While the invention has been illustrated with respect to the transformations leading to the preparation of compounds having 2-diethylaminoethylamino as the 1-substituent and having no substituents at ring-positions 5, 6, 7 or 8, it will be understood that homologs and analogs having other 1-substitutents, for example, 2-dimethylaminoethylamino, 3-diethylaminopropylamino, 4-dimethylaminobutylamino, 2-di-n-butylaminoethylamino, 2-(ethylmethylamino)ethylamino, 2-piperidinoethylamino, 2-pyrrolidinoethylamino, 2-(2,6-dimethylpiperidino)ethylamino, 2-[N-ethyl-N-(2-hydroxyethyl)amino]ethylamino, and the like, and having ring-substituents, for example, 6-chloro, 7-chloro, 7-bromo, 5-chloro, 7-methyl, 7-ethoxy, 8-methoxy, 6,7-dimethoxy, 5,6,7-trimethyl, and the like, can be prepared in a completely analogous fashion.

The 1-[$R_1R_2$N-Y-N(CH$_3$)]thioxanthen-9-ones of the invention can be prepared for use by conventional pharmaceutical procedures: that is, by dissolving or suspending it in a pharmaceutically acceptable vehicle, e.g., aqueous alcohol, glycol, oil solution, or oil-water emulsion, for parenteral or oral administration; or by incorporating it in unit dosage form as tablets or capsules for oral administration either alone or in combination with conventional adjuvants, e.g., calcium carbonate, starch, lactose, talc, magnesium stearate, gum acacia, and the like.

We claim:

1. The process which comprises heating 1-chlorothioxanthen-9-one with $R_1R_2$N-Y-NHCH$_3$ to yield 1-[$R_1R_2$N-Y-N(CH$_3$)]thioxanthen-9-one, reacting the latter compound with phosphorus oxyhalide and dimethylformamide to yield 1-[$R_1R_2$N-Y-N(CH$_3$)]-9-oxothioxanthene-4-carboxaldehyde and reacting said aldehyde with pyridine hydrochloride to produce 1-($R_1R_2$N-Y-NH)-9-oxothioxanthene-4-carboxaldehyde where $R_1$ and $R_2$ are each lower-alkyl and Y is lower-alkylene having from two to four carbon atoms and having its two connecting linkages on different carbon atoms.

2. The process according to claim 1 where $R_1$ and $R_2$ are each ethyl and Y is CH$_2$CH$_2$.

3. The process which comprises reacting 1-[$R_1R_2$N-Y-N(CH$_3$)]thioxanthen-9-one with phosphorus oxyhalide and dimethylformamide to yield 1-[$R_1R_2$N-Y-N(CH$_3$)]-9-oxothioxanthene-4-carboxaldehyde and reacting said aldehyde with pyridine hydrochloride to produce 1-($R_1R_2$N-Y-NH)-9-oxothioxanthene-4-carboxaldehyde where $R_1$ and $R_2$ are each lower-alkyl and Y is lower-alkylene having from two to four carbon atoms and having its two connecting linkages on different carbon atoms.

4. The process according to claim 3 where $R_1$ and $R_2$ are each ethyl and Y is CH$_2$CH$_2$.

5. The process which comprises reacting 1-[$R_1R_2$N-Y-N(CH$_3$)]thioxanthen-9-one with phosphorus oxyhalide and dimethylformamide yield 1-[$R_1R_2$N-Y-N(CH$_3$)]-9-oxothioxanthene-4-carboxaldehyde, where $R_1$ and $R_2$ are each lower-alkyl and Y is lower-alkylene having from two to four carbon atoms and having its two connecting linkages on different carbon atoms.

6. The process according to claim 5 where $R_1$ and $R_2$ are each ethyl and Y is CH$_2$CH$_2$.

7. The process which comprises reacting 1-[$R_1R_2$N-Y-N(CH$_3$)]-9-oxothioxanthene-4-carboxaldehyde with pyridine hydrochloride to produce 1-($R_1R_2$N-Y-NH)-9-oxothioxanthene-4-carboxaldehyde where $R_1$ and $R_2$ are each lower-alkyl and Y is lower-alkylene having from two to four carbon atoms and having its two connecting linkages on different carbon atoms.

8. The process according to claim 7 where $R_1$ and $R_2$ are each ethyl and Y is CH$_2$CH$_2$.

9. The process according to claim 3 where $R_1$ and $R_2$ are each ethyl, Y is CH$_2$CH$_2$ and phosphorus oxychloride is used.

10. The process according to claim 5 where $R_1$ and $R_2$ are each ethyl, Y is CH$_2$CH$_2$ and phosphorus oxychloride is used.

* * * * *

UNITED STATES PATENT OFFICE
CERTIFICATE OF CORRECTION

Patent No. 3,764,612            Dated October 9, 1973

Inventor(s) Joseph C. Collins and David Rosi

It is certified that error appears in the above-identified patent and that said Letters Patent are hereby corrected as shown below:

In the title, your designate [54], line 3 "OROTHIOXANTHENE" should read -- OXOTHIOXANTHENE --.

In the title in column 1, line 2, "OROTHIOXANTHENES" should read -- OXOTHIOXANTHENES --; and, line 3, omit the "-" in "CARBOXALDEHYDES".

Column 1, line 5, omit "PROCESSES AND COMPOUNDS".

Column 2, line 55, immediately following "and," omit the remainder of the line and in place thereof insert -- also, the di-(lower-alkyl)- --.

Signed and sealed this 18th day of June 1974.

(SEAL)
Attest:

EDWARD M. FLETCHER, JR.             C. MARSHALL DANN
Attesting Officer                     Commissioner of Patents